United States Patent

[11] 3,633,171

[72] Inventor Leonard Ornstein White Plains, N.Y.
[21] Appl. No. 886,315
[22] Filed Dec. 18, 1969
[45] Patented Jan. 4, 1972
[73] Assignee Mount Sinai Research Foundation, Inc. New York, N.Y.

[54] DATA PROCESSING
8 Claims, 4 Drawing Figs.

[52] U.S. Cl. .......... 340/172.5
[51] Int. Cl. .......... G11c 9/00
[50] Field of Search .......... 340/172.5, 147, 166

[56] References Cited

UNITED STATES PATENTS

| | | | |
|---|---|---|---|
| 3,043,512 | 7/1962 | Buckingham et al. | 340/147 T |
| 3,229,253 | 1/1966 | Logue | 340/166 |
| 3,300,586 | 1/1967 | Shepard | 340/172.5 X |
| 3,427,584 | 2/1969 | Reszka | 340/147 X |

OTHER REFERENCES

IBM Tech. Disclosure Bulletin, Vol. 8, No. 4 Sept. 1965, pages 549–550

IBM Tech. Disclosure Bulletin, Vol. 4, No. 7 Dec. 1961, pages 48–49

*Primary Examiner*—Gareth D. Shaw
*Assistant Examiner*—Paul R. Woods
*Attorney*—Brumbaugh, Graves, Donohue & Raymond

ABSTRACT: A computer system includes a high-capacity storage for storing a set of information, additional information-handling means for handling a subset of information selected from the set of information, and a truncated relay tree. In reading stored information, the large end of the truncated relay tree is normally the input end and is connected to the high-capacity storage; the small, truncated end is normally the output end and is connected to the additional information-handling means. The number of tree input terminals equals the number of bits of information in the set and can be as large as desired—for example, a billion or more; the number of tree output terminals equals the number of bits of information in the subset and can also equal the bit capacity of the additional information-handling means—for example, of the order of tens or hundreds of thousands. The truncated relay tree provides access to vast stores of information with a speed characteristic of random access memories.

INVENTOR.
LEONARD ORNSTEIN

BY
Brumbaugh, Graves, Donohue & Raymond his ATTORNEYS

INVENTOR.
LEONARD ORNSTEIN
BY
Brumbaugh, Graves, Donohue & Raymond
his ATTORNEYS

DATA PROCESSING

BACKGROUND OF THE INVENTION

This invention relates to apparatus and methods for providing rapid access to vast stores of information and, more particularly, to novel and highly effective apparatus and methods for transferring a selected subset of a set of information between high-capacity storage and additional information-handling means which may include a high-speed, random-access memory of less storage capacity.

In the present state of the computer art, it is possible to construct a random-access memory that is very fast in the sense that access to any given bit of information stored in the memory can be gained in a very short time—measured in millionths or even billionths of a second. Such a memory is relatively expensive per bit, however, and it is not practicable to build it in a size large enough to give the computer random access to all of the information required in the execution of certain tasks.

It is also possible to build means for storing inexpensively as many bits of information as may be desired. Such storage means, however, constitutes a "slow" memory in that the time required for access to a given bit of information in the memory is many orders of magnitude greater than the time required for access to a given bit of information in fast memory.

Up to the time of the present invention, it has been impossible to retrieve information selected from a set of more than a few millions of bits with a speed characteristic of high-speed, random-access memories. It is highly desirable, in the interest of increasing computer capabilities and reducing the cost of computer time, to provide less expensive computer apparatus adapted to retrieve information selected from any desired quantity of stored information with a speed characteristic of random-access memories.

SUMMARY OF THE INVENTION

An object of the present invention is to remedy the shortcomings of conventional apparatus noted above. In particular, an object of the invention is to provide computer apparatus adapted to retrieve selected subsets of a truly vast set of stored information with a speed characteristic of high-speed, random-access memories.

The foregoing and other objects of the invention are attained by the provision of apparatus including branching circuit means in the form of a truncated address tree for transferring a selected subset of a set of information between high-capacity storage means and additional information-handling means which may include a high-speed, random-access memory. The branching circuit means is preferably cryogenic and is formed with a large end having a number of terminals equal to the number bits of information in the set and a small end having a number of terminals equal to the number of bits in the subset.

The connections to the terminals at the large end constitute the high-capacity storage means, and the terminals at the small end are connected to the additional information-handling means. The branching circuit means includes control means which when actuated causes the branching circuit means to transfer the selected subset of information between the high-capacity storage means and the additional information-handling means.

The number of terminals at the large end can exceed the number of terminals at the small end by a factor of thousands. For example, the number of terminals at the large end may exceed one billion, and the number of terminals at the small end can be of the order of tens or hundreds of thousands.

BRIEF DESCRIPTION OF THE DRAWING

An understanding of additional aspects of the invention can be gained from a consideration of the following detailed description of a representative embodiment thereof, in conjunction with the accompanying figures of the drawing, wherein.

DESCRIPTION OF THE PREFERRED EMBODIMENT

Figures 1, 2:
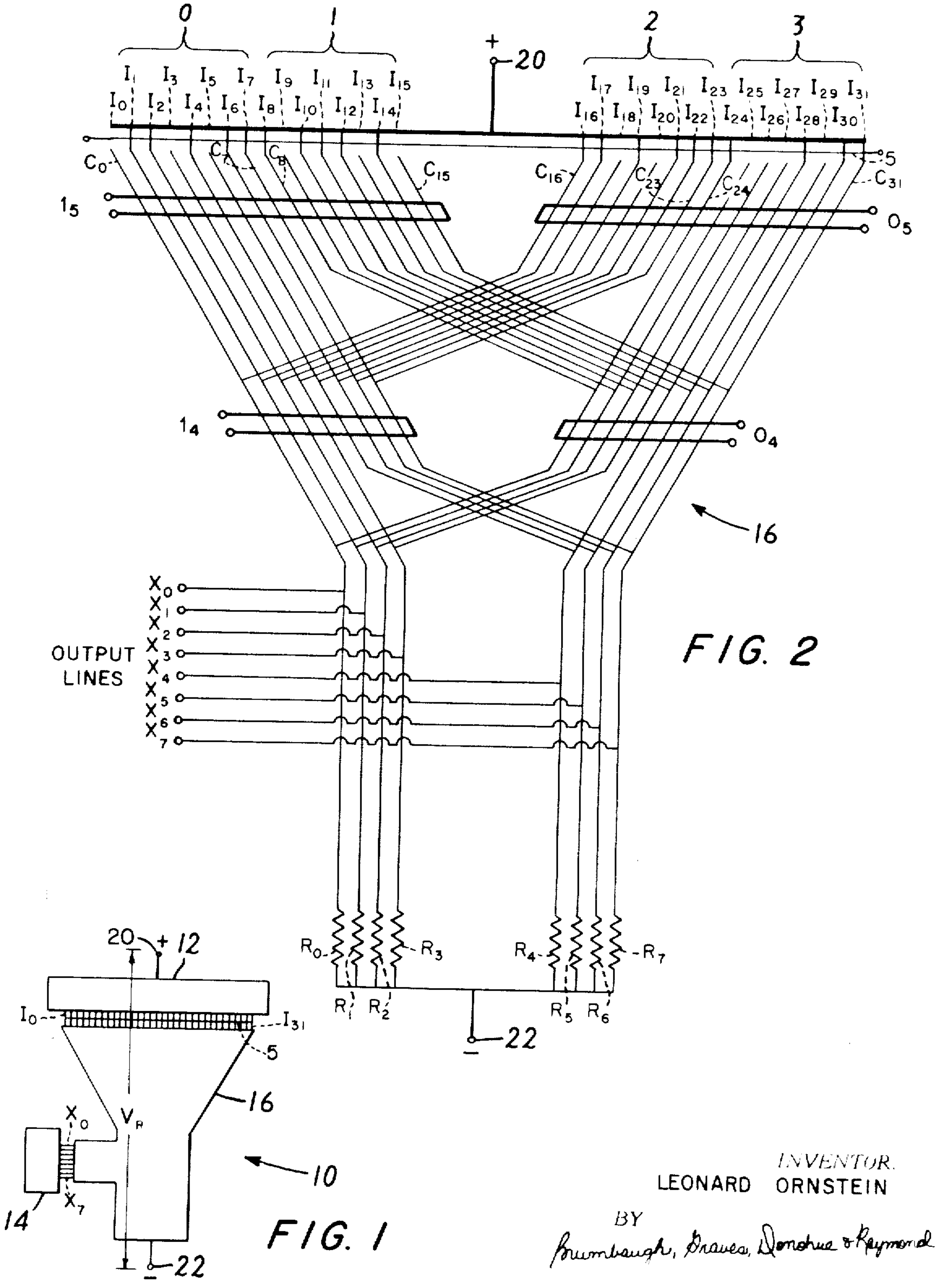
FIG. 1 is a highly schematic representation of computer apparatus constructed in accordance with the invention.
FIG. 2 is a schematic representation, in greater detail than FIG. 1, of a portion of the apparatus of FIG. 1.

FIG. 1 shows apparatus 10 constructed in accordance with the invention. The apparatus 10 includes high-capacity storage means 12 for storing a set of information and additional information-handling means 14 for handling a subset of information selected from the set of information. Branching circuit means 16 in the form of a truncated address tree connects the high-capacity storage means 12 and the additional information-handling means 14.

The high-capacity storage means 12 and associated branching means 16 can be very inexpensive in proportion to the quantity of information stored.

The additional information-handling means 14 can be conventional and can comprise, for example, a high-speed, random-access computer memory having a storage capacity much less than that of the high-capacity storage means 12.

The branching circuit means 16 is novel and includes a number of inputs $I_0$ through $I_{31}$ and a number of outputs $X_0$ through $X_7$. In a practical embodiment, the number of inputs is very large: for example, a billion or more, one corresponding to each bit of information in the high-capacity storage means 12, and the number of outputs is much smaller: for example, tens or hundreds of thousands, one corresponding to each bit position in the additional information-handling means 14. It is obviously infeasible to illustrate such large numbers of terminals, and the drawings are necessarily simplified in this respect.

The high-capacity storage means 12 contains any desired set of information: for example, all of the information in the Library of Congress, suitably coded for computer processing. The conventional, additional information-handling means 14 is adapted to give access to information stored therein very quickly: for example, in millionths or billionths of a second; and the branching circuit means 16 is adapted to transfer with comparable speed selected subsets of the set of information stored in the high-capacity storage means 12 to the high-speed storage means 14. In this way, high-speed, random-access is gained to all of the information in the high-capacity storage means 12.

FIG. 2 shows how the branching circuit means 16 accomplishes its intended function.

The branching circuit means 16 can be made in many ways. In the preferred embodiment of the invention it is a cryogenic, miniaturized printed circuit comprising tin (Sn) conductors $C_0$–$C_{31}$ and lead (Pb) control lines $1_5$, $0_5$ and $1_4$, $0_4$. The conductors $C_0$–$C_{31}$ may be spaced at 2-micrometer intervals and may be 1-micrometer-wide and less than 1-micrometer-thick. The entire assembly is refrigerated to a temperature below the critical temperature of Sn so that the Sn conductors $C_0$–$C_{31}$ offer no resistance to an electrical current as long as less than critical current flows in the Pb control lines. Each relay element is then a crossed film cryotron. In a practical embodiment, in-line cryotron controls (rather than crossed films) in a low-inductance pattern with shield planes are used in order to maximize off-resistance and the speed of response of the circuit means 16 to the control lines constituted by the lines $1_5$, $0_5$ and $1_4$, $0_4$, and minimize crosstalk and power dissipation.

Figure 3:
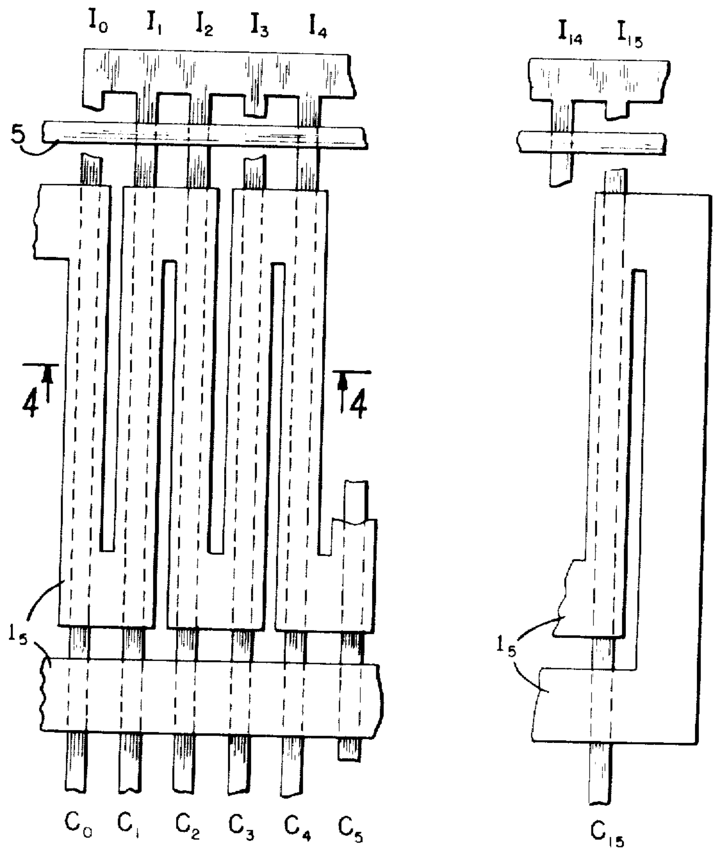
FIG. 3 is a detailed plan view of a portion of the apparatus of FIG. 2.
Figure 4:
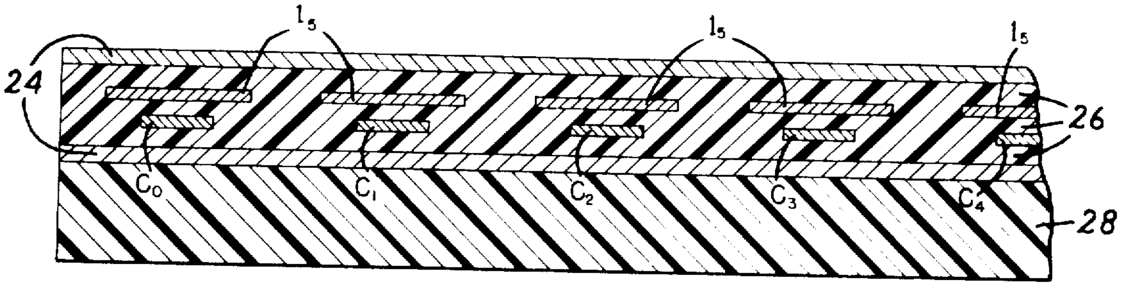
FIG. 4 is a sectional view taken generally along the line 4—4 of FIG. 3 and looking in the direction of the arrows.

The illustration of a full set of in-line controls and shield planes in FIG. 2 would be excessively complex. FIG. 2 is therefore simplified by illustrating crossed film cryotrons for clarity, FIGS. 3 and 4 illustrate a low-inductance configuration of in-line cryotron controls for a few branches of level 5 of the relay tree. The figures show one of the Pb control lines $1_5$ and several of the Sn conductors $C_0$–$C_8$ and $C_{15}$ of FIG. 2 and their relationship to Pb shield planes 24, insulating layers 26, and support substrate 28 for the circuit. An input voltage difference $V_R$ is applied between a terminal 20, and a terminal 22. Each lower end of a Sn "branch" feeds a different one of the electrical loads $R_0$–$R_7$, which may be physically incorporated in the information-handling means 14 or the branching circuit means 16.

When the appropriate current flows in any given Pb control line, the magnetic field generated switches the underlying Sn lines from superconducting to normal states. Thus, the resistance of the Sn lines to electrical current increases from zero to a finite value and the "gates" constituted by the overlapping regions of that control line with those conductors are closed. For simplicity, it is assumed for the moment that the input ends $I_0$–$I_{31}$ of the Sn wires $C_0$–$C_{31}$ are either permanently connected to the input or not, to store a one or zero, respectively (for example, $I_0$ and $I_3$ are shown as unconnected and $I_1$, $I_2$ and $I_4$ as connected), so that with this invention it is possible to read from the memory 12 (which is all that is desired in many cases) but not to record in the memory 12 (except by means of additional apparatus). With modification, the device 16 can be used to record in the memory 12, as explained below.

The branching elements of the circuits variously referred to by those skilled in the art as address trees and relay trees are conventionally used for steering control signals to control lines in digital memories. Different circuit elements ordinarily referred to as sense lines are conventionally used to carry signals representing the stored information from digital memories to their outputs. The use in a digital memory device in accordance with the present invention of address tree branches as sense lines rather than control lines is novel.

In FIG. 2, the number of levels L of switches is 2 and the number of ranches M at each branch point is also 2. The number of subsets of information that can be selectively transferred from the input to the output is thus $2^2$=4. Each subset has eight bits of information and the entire set has 4×8=32 bits of information. The parameters L and M can both vary, though in most cases M=2 is the most convenient choice. In a practical embodiment, the number of input terminals (and the bit capacity of the high-capacity storage 12) might be $2^{31}$ or more than $2\times10^9$. If the number of output terminals is $2^{17}$ or about $10^5$, then the number of levels L in the tree is 31−17=14. Then, with a 14-bit binary address, the operation of which is explained below, the branching circuit means 16 can transfer from the input terminals to the output terminals any one of $2^{14}$ or more than $10^4$ subsets of information, each subset including $2^{17}$ or more than $10^5$ bits.

Even if the cryotron switches are relatively slow (for example, $10^{-4}$ seconds), such a device vastly increases the apparent high-speed random-access capability of a present-generation general purpose computer.

For example, where it is desired to transfer to the output a subset of information appearing at the input terminals $I_0$ through $I_7$ (i.e., the information 01101011), a current is passed through the control lines $0_4$, $0_5$ and not through the control lines $1_4$, $1_5$. At the level of the control lines $1_5$, $0_5$, this effectively opens switches in the conductors $C_{16}$ through $C_{31}$, leaving closed switches in the conductors $C_0$ through $C_{15}$. Thus, the information appearing at the inputs $I_0$ through $I_{15}$ is passed to the level of the control lines $1_4$, $0_4$. This information is 0110101110111010. At the level of the control lines $1_4$, $0_4$, the current passed through the control line $0_4$ effectively opens switches in the continuations of the conductors $C_8$–$C_{15}$. Since no current is passed through the control line $1_4$, switches in the continuations of the conductors $C_0$– $C_7$, remain effectively closed, and only the bits of information appearing at the input positions $I_0$–$I_7$ (i.e., only the information subset 0: mainly, 01101011) are read at the output. These bits are read for example as the presence or absence of voltages between each of the output terminals $X_0$–$X_7$, respectively, and the terminal 22. Such voltages take the form of voltage differences across the respective load resistors $R_0$–$R_7$. This information is then available for further processing by the additional information-handling means 14, which may include a high-speed memory.

As a second example, where it is desired to transfer to the output the subset of information appearing at the input terminals $I_8$ through $I_{15}$ (i.e., the information 10111010), a current is passed through the control lines $0_5$, $1_4$ and not through the control lines $1_5$, $0_4$. At the level of the control lines $1_5$, $0_5$ this effectively opens switches in the conductors $C_{16}$ through $C_{31}$ and leaves closed switches in the conductors $C_0$ through $C_{15}$. Thus, the information appearing at the input $I_0$ through $I_{15}$ is passed to the level of the control lines $1_4$, $O_4$. This information, as in the previous example, is 0110101110111010. At the level of the control lines $1_4$, $0_4$, the current passed through the control lines $1_4$ effectively opens switches in the continuations of the conductors $C_0$ through $C_7$. Since no current is passed through the control line $0_4$, switches in the continuations of the conductors $C_8$ through $C_{15}$ remain effectively closed, and only the bits of information appearing in input positions $I_8$ through $I_{15}$ (i.e., only the information subset 1: namely, 10111010) are read at the output terminals $X_0$–$X_7$, respectively. This information is then available for further processing by the additional information-handling means 14.

To take another example, if it is desired to read at the output terminals $X_0$–$X_7$ the information at the input positions $I_{16}$ through $I_{23}$ (subset 2), then a current is passed through the control lead $1_5$, effectively opening switches in the conductors $C_0$ through $C_{15}$. No current passes through the control lead $0_5$, so that the input information at the inputs $I_{16}$ through $I_{31}$ (1101011110001011 is passed from the level of the control lines $1_5$, $0_5$ to the level of the control lines $1_4$, $0_4$. At the latter level, where it is desired to pass the information appearing at the inputs $I_{16}$ through $I_{23}$ and block the information appearing at the inputs $I_{24}$ through $I_{31}$, a current is passed through the control line $0_4$ and not through the control line $1_4$. Thus, the continuations of conductors $C_{24}$ through $C_{31}$ are effectively switched open, and the continuations of the conductors $C_{16}$ through $C_{23}$ remain conducting. This passes the information on the latter conductors (11010111) to the output terminals $X_0$–$X_7$ for further processing.

As a final example, where it is desired to read at the output terminals $X_0$–$X_7$ the information appearing at the inputs $I_{24}$ through $I_{31}$, current is passed through the control lines $1_5$, $1_4$ but not through the control lines $0_5$, $0_4$. This in effect opens switches in the conductors $C_0$ through $C_{16}$, leaving the conductors $C_{16}$ through $C_{31}$ conductive at the level of the control lines $1_5$, $0_5$. The information appearing in the inputs $I_{16}$ through $I_{31}$ is therefore passed to the level of the control lines $1_4$, $0_4$. At the latter level, current is passed through the control line $1_4$ but not through the control line $0_4$. This effectively opens switches in continuations of the conductors $C_{16}$ through $C_{23}$ and leaves closed switches in continuations of the conductors $C_{24}$ through $C_{31}$. This passes the information at the inputs $I_{24}$ through $I_{31}$ to the outputs. This information is 10001011 (subset 3).

The illustrated device is thus adapted to transfer any one of four subsets, 0 through 3, of information selected from the entire set of information. The control line code corresponds to the identity in binary notation of the subset of information transferred. Thus, the code 00 (meaning that the control lines $0_5$, $0_4$ carry current) transfers subset 0; the code 01 (meaning that the control lines $0_5$, $1_4$ carry current) transfers subset 1; the code 10 (meaning that the control lines $1_5$, $0_4$ carry current) transfers subset 2; and the code 11 (meaning that the control lines $1_5$, $0_4$ carry current) transfers subset 3.

The information to be recorded in the high-capacity storage means 12 can be placed there in many ways. Initially, for example, the printed circuit can be fabricated with all of the Sn input connections $I_0$–$I_{31}$ to the Sn conductors $C_0$–$C_{31}$ intact. A crossed film Pb line 5 with smaller areas of overlap with the conductors $C_0$–$C_{31}$ than the in-line control lines have is incorporated in the structure overlying the connections between the inputs $I_0$–$I_{31}$ and the Sn conductors $C_0$–$C_{31}$.

To place the subset 0 in storage, it is possible to send a current through the control lines $0_5$, $0_4$, thus connecting the input terminals $I_0$ through $I_7$ to the output terminals $X_0$ through $X_7$. By passing current through the line 5, the underlying sections of all of the Sn lines $C_0$–$C_{31}$ are switched to the resistive state. By applying an appropriate high-writing voltage $V_R$ between the terminal 20 and the output terminals $X_0$, $X_3$ and $X_5$, the Sn conductors $C_0$, $C_3$ and $C_5$ are selectively burned out at their connections to the inputs $I_0$, $I_3$ and $I_5$ underlying 5 so that they are permanently opened as in FIG. 2.

The subset 1 of information is placed into storage in the same way except that the line 5 and control lines $0_5$, $1_4$ carry current and the connections between the conductors $C_9$, $C_{13}$ and $C_{15}$ and the corresponding input positions are burned open.

Similarly, in placing subset 2 into storage, the line 5 and control lines $1_5$, $0_4$ carry current and the connections between the conductors $C_{18}$, $C_{20}$ and the inputs $I_{18}$, $I_{20}$ are burned open.

In placing subset 3 of information into storage, the line 5 and control lines $1_5$, $1_4$ carry current, and the connections between the conductors $C_{25}$ through $C_{27}$ and $C_{29}$ and the inputs $I_{25}$ through $I_{27}$ and $I_{29}$, respectively, are burned open.

At greater expense, appropriate devices such as ferroelectric switching elements or Shockley diodes can be employed as the connections so that it becomes possible to clear the high-capacity storage at various times and store different information therein.

In all of the examples above, both as to reading from high-capacity storage and as to writing in high-capacity storage, the particular information in the various subsets is of course arbitrarily chosen.

Conceived as a method, the invention comprises the steps of generating a set of signals at the inputs $I_0$ through $I_{31}$ containing a set of information and dividing the signals into at least two parts, one of the parts containing a subset of information for further processing. Such division is effected by sending a current through the line $1_5$ or $0_5$. The part containing the subset is further divided into at least two additional parts, one of the additional parts containing the subset. The latter division is effected by sending a current through the line $1_4$ or $0_4$. The process of division is repeated at as many levels as may be necessary until the signals containing the subset are isolated, and the isolated signals are supplied to a computer through the outputs $X_0$ through $X_7$.

Thus there is provided in accordance with the invention novel and highly effective computer apparatus vastly increasing the capabilities of computers and, in particular, increasing the speed with which truly vast stores of information can be supplied to computers. The present invention gives computers high-speed access to vast quantities of information at reasonable cost.

Many modifications of the representative embodiments of the invention disclosed herein will readily occur to those skilled in the art. Accordingly, the invention is to be construed as including all of the modifications thereof within the scope of the appended claims.

I claim:

1. Apparatus for transferring a selected subset of a set of information between high-capacity storage and lower capacity storage, comprising branching circuit means in the form of a truncated address tree formed with a large end having a number of terminals equal to the number of bits of information in said set and a small end having a number of terminals equal to the number of bits of information in said subset.

2. Computer apparatus comprising high-capacity storage means for storing a set of information, additional information-handling means for handling a subset of information selected from said set of information and branching circuit means in the form of a truncated address tree connecting said high-capacity storage means and said additional information-handling means, said branching circuit means being formed with a large end provided with a number of terminals equal to the number of bits of information in said set and a small end provided with a number of terminals equal to the number of bits of information in said subset, the presence of connections of low- or high-electrical impedance to said terminals at said large end constituting the high-capacity storage means, said low-impedance connections constituting stored binary digits of one kind and said high-impedance connections constituting stored binary digits of the other kind, sand terminals at said small end being connected to said additional information-handling means, and said branching circuit means including control means which when actuated causes said branching circuit means to transfer a selected subset of information between said high-capacity storage means and said additional information-handling means.

3. Computer apparatus comprising high-capacity storage means for storing a set of information, additional information-handling means for handling a subset of information selected from said set of information and cryogenic branching circuit means connecting said high-capacity storage means and said additional information-handling means, said branching circuit means being formed with a large end provided with a number of terminals equal to the number of bits of information in said set and a small end provided with a number of terminals equal to the number of bits of information in said subset, the presence or absence of connections to said terminals at said large end constituting the high-capacity storage means and said terminals at said small end being connected to said additional information-handling means, and said branching circuit means including control means which when actuated causes said branching circuit means to transfer a selected subset of information between said high-capacity storage means and said additional information-handling means.

4. Computer apparatus comprising high-capacity storage means for storing a set of information, additional information-handling means for handling a subset of information selected from said set of information and branching circuit means connecting said high-capacity storage means and said additional information-handling means, said branching circuit means being formed with a large end provided with a number of terminals equal to the number of bits of information in said set and a small end provided with a number of terminals equal to the number of bits of information in said subset, the number of said terminals at said large end exceeding the number of said terminals at said small end by a factor of at least a thousand, he presence or absence of connections to said terminals at said large end constituting the high-capacity storage means and said terminals at said small end being connected to said additional information-handling means, and said branching circuit means including control means which when actuated causes said branching circuit means to transfer a selected subset of information between said high-capacity storage means and said additional information-handling means.

5. Computer apparatus comprising high-capacity storage means for storing a set of information, additional information-handling means for handling a subset of information selected from said set of information and branching circuit means connecting said high-capacity storage means and said additional information-handling means, said branching circuit means being formed with a large end provided with a number of terminals exceeding one billion and equal to the number of bits of information in said set and a small end provided with a number of terminals equal to the number of bits of information in said subset, the presence or absence of connections to said terminals at said large end constituting the high-capacity storage means and said terminals at said small end being connected to said additional information-handling means, and said branching circuit means including control means which when actuated causes said branching circuit means to transfer a selected subset of information between said high-capacity storage means and said additional information-handling means.

6. Computer apparatus comprising high-capacity storage means for storing a set of information, additional information-handling means for handling a subset of information selected from said set of information and branching circuit means connecting said high-capacity storage means and said additional information-handling means, said branching circuit means being formed with a large end provided with a number of terminals equal to the number of bits of information in said set and a small end provided with a number of terminals of the order of tens of thousands and equal to the number of bits of information in said subset, the presence or absence of connections to said terminals at said large end constituting the high-capacity storage means and said terminals at said small end being connected to said additional information-handling means, and said branching circuit means including control means which when actuated causes said branching circuit means to transfer a selected subset of information between said high-capacity storage means and said additional information-handling means.

7. Computer apparatus comprising high-capacity storage means for storing a set of information, lower capacity storage means for storing a subset of information selected from said set of information, and branching circuit means in the form of a truncated address tree connecting said high-capacity storage means and said lower capacity storage means, said branching circuit means being formed with a large end provided with a number of input terminals equal to the number of bits of information in said set and a small end provided with a number of output terminals equal to the number of bits of information in said subset, the presence of connections of low- or high-electrical impedance to said input terminals constituting said high-capacity storage means, said low-impedance connections constituting stored binary digits of one kind and said high-impedance connections constituting stored binary digits of the other kind, said output terminals being connected to said lower capacity storage means, and said branching circuit means including control means which when actuated causes said branching circuit means to transfer a selected subset of information from said high-capacity storage means to said lower capacity storage means.

8. Computer apparatus comprising high-capacity storage means for storing a set of information, lower capacity storage means comprising a random-access memory for storing a subset of information selected from said set of information, and branching circuit means connecting said high-capacity storage means and said lower capacity storage means, said branching circuit means being formed with a large end provided with a number of input terminals equal to the number of bits of information in said set and a small end provided with a number of output terminals equal to the number of bits of information in said subset, the presence or absence of connections to said input terminals constituting said high-capacity storage means and said output terminals being connected to said lower capacity storage means, and said branching circuit means including control means which when actuated causes said branching circuit means to transfer a selected subset of information from said high-capacity storage means to said lower capacity storage means.

* * * * *